(12) United States Patent
Hill

(10) Patent No.: US 12,054,806 B2
(45) Date of Patent: Aug. 6, 2024

(54) URANIUM PROCESSING USING HYDROCYCLONE BENEFICIATION

(71) Applicant: Uranium Beneficiation Pty Ltd, West Perth (AU)

(72) Inventor: Murray Philip Hill, Booragoon (AU)

(73) Assignee: Uranium Beneficiation PTY Ltd., West Perth (AU)

( * ) Notice: Subject to any disclaimer, the term of this patent is extended or adjusted under 35 U.S.C. 154(b) by 316 days.

(21) Appl. No.: 15/999,090

(22) PCT Filed: Feb. 15, 2016

(86) PCT No.: PCT/AU2016/000040
§ 371 (c)(1),
(2) Date: Aug. 15, 2018

(87) PCT Pub. No.: WO2017/139827
PCT Pub. Date: Aug. 24, 2017

(65) Prior Publication Data
US 2021/0025028 A1    Jan. 28, 2021

(51) Int. Cl.
| | | |
|---|---|---|
| *B03B 5/34* | (2006.01) | |
| *B03B 7/00* | (2006.01) | |
| *B03B 9/00* | (2006.01) | |
| *B03D 1/02* | (2006.01) | |
| *C22B 1/00* | (2006.01) | |
| *C22B 3/22* | (2006.01) | |
| *C22B 60/02* | (2006.01) | |

(52) U.S. Cl.
CPC ............ *C22B 60/0252* (2013.01); *B03B 5/34* (2013.01); *B03B 7/00* (2013.01); *B03B 9/00* (2013.01); *B03D 1/02* (2013.01); *C22B 1/00* (2013.01); *C22B 3/22* (2013.01); *C22B 60/0208* (2013.01); *C22B 60/0226* (2013.01); *B03D 2203/04* (2013.01)

(58) Field of Classification Search
CPC .. B03B 5/34; B03B 9/00; B02C 23/10; B04C 7/00; C22B 1/00; C22B 60/0208
See application file for complete search history.

(56) References Cited

U.S. PATENT DOCUMENTS

| | | | | |
|---|---|---|---|---|
| 2,813,003 A |   | 11/1957 | Thunaes | |
| 2,968,524 A | * | 1/1961 | Seeton | C22B 15/0063 423/18 |
| 3,134,651 A | * | 5/1964 | Bice | C01G 43/00 159/13.1 |
| 3,976,251 A |   | 8/1976 | Gambopoulos | |
| 4,026,479 A | * | 5/1977 | Bradburn | B02C 17/1805 241/30 |
| 5,053,119 A |   | 10/1991 | Collins | |
| 7,111,738 B2 | * | 9/2006 | Allen, III | B29B 17/02 209/172 |
| 8,652,425 B2 |   | 2/2014 | Bassil | |
| 9,718,066 B2 | * | 8/2017 | Hartmann | B03B 7/00 |
| 2004/0164005 A1 |   | 8/2004 | Allen, III | |
| 2012/0209550 A1 | * | 8/2012 | Van Der Spek | B04C 11/00 702/63 |
| 2013/0270475 A1 |   | 10/2013 | Lazzaro | |
| 2016/0008822 A1 | * | 1/2016 | Hartmann | B03C 1/30 209/8 |
| 2016/0207050 A1 | * | 7/2016 | Van Der Spek | B04C 11/00 |
| 2020/0354813 A1 | * | 11/2020 | Hill | B03B 7/00 |
| 2021/0023570 A1 | * | 1/2021 | Maron | B02C 25/00 |

FOREIGN PATENT DOCUMENTS

| | | | |
|---|---|---|---|
| DE | 2039563 A | * 2/1972 | ............ B03D 3/00 |
| DE | 2039563 A1 | 2/1972 | |
| DE | 28 30 979 A1 | 1/1980 | |
| GB | 827443 | 2/1960 | |
| RU | 2565625 C1 | 10/2015 | |
| WO | WO-2006/024886 A1 | 3/2006 | |

OTHER PUBLICATIONS

English Machine Translation of DE 2830979 A1; Inventor: Floeter et al.; Pub. Date: Jan. 1980 (Year: 1980).*
Uranium, Mining, Processing, and Reclamation, National Research Council, Pub Date: Dec. 2011 (Year: 2011).*
English Translation of DE 2039563 A1; Inv: Wilhelms; Pub Date: Feb. 1972 (Year: 1972).*
English Translation of DE 2830979 A1; Inv: Floeter; Pub. Date: Jan. 1980 (Year: 1980).*
International Search Report and Written Opinion issued in corresponding International Application No. PCT/AU2016/000040 mailed May 18, 2016.
E. J. Pryor, "Principles of Froth Flotation", Mineral Processing, 1965, pp. 457-519.
Y. Liu, et al., "Flotation Separation of Carbonate from Sulfide Minerals, I: Flotation of Single Minerals and Mineral Mixtures", Minerals Engineering, vol. 17, Issues 7-8, Jul.-Aug. 2004, pp. 855-863.
Translated Figure 1 for DE 2830979; 1 page.
International Search Report for PCT/AU2017/000043, mailed Mar. 20, 2017, 5 pgs.

* cited by examiner

*Primary Examiner* — Joseph C Rodriguez
(74) *Attorney, Agent, or Firm* — Blank Rome LLP

(57) ABSTRACT

The disclosure relates to a beneficiation process for uranium ore comprising a hydrocyclone step that produces an underflow fraction containing uranium values for further processing and an overflow fraction containing fine particulate waste material.

20 Claims, No Drawings

URANIUM PROCESSING USING HYDROCYCLONE BENEFICIATION

TECHNICAL FIELD

The technology relates to the use of one or more hydrocyclone step(s) in a beneficiation process for uranium ore.

BACKGROUND

Physical beneficiation of low grade ores to yield a higher grade product as feedstock for further downstream processing is a key component of many metallurgical operations. The format of the overall physical beneficiation process, which may consist of more than one individual but integrated unit steps, is typically designed to maximise a number of positive technical and economic outcomes when the processing flowsheet is considered in detail as a whole.

Regardless of the mineralogical complexity and number of target minerals of an ore, the format of the physical beneficiation process is primarily concerned with achieving the optimum balance between the grade of the beneficiation product(s) and the overall recovery of the target mineral(s) into the beneficiation product(s). This balance is especially relevant for lower grade and more complex ores, and more especially ores that contain one or more target minerals.

Uranium ores and concentrates are typically leached under either alkaline or acidic conditions, the choice of leachant being a direct consequence of the uranium mineralogy, and more particularly the mineralogy and relative proportions of the matrix of gangue minerals. For some run-of-mine uranium ores the grade and mineralogy are such that pre-leach treatment is limited to crushing and agglomeration for heap leaching, or crushing and wet grinding for conventional tank leaching.

For low grade uranium ores, a concentrated feedstock for subsequent leaching will often be produced by a combination of physical techniques such as radiometric sorting, scrubbing, grinding, screening, elutriation, heavy media separation, gravity separation, magnetic separation or flotation. For example, U.S. Pat. Nos. 2,647,629, 2,697,518, 3,964,997, 4,070,276 and WO 2011/161650 describe procedures for producing uranium concentrates by froth flotation procedures of varying complexity. The feedstocks for the processes described in these documents include run-of-mine ores, tailings and sulphide (pyrite) concentrates. The complexity of the froth flotation procedures is a reflection of the mineralogical complexity of the feedstock and the level of concentration (upgrading or mass pull) required due to the large volume and low concentration of uranium in the feedstock. Thus, for example, WO 2011/161650 describes a method in which the flotation collector is added incrementally in 3 to 6 separate steps. This adds considerably to the physical size and complexity of the froth flotation circuit. As a consequence, the processing of low grade uranium ores by methods known in the art is often sub-economic.

Although it is known that hydrocyclones can be used to beneficiate uranium ores, such methods have only been used to recover uranium minerals in the fine fraction (i.e., the material that reports in the hydrocyclone overflow) with rejection of the coarse material (i.e., the material that reports in the hydrocyclone underflow). For example, U.S. Pat. No. 2,968,524 describes the use of conventional jig to produce a coarse uranium concentrate and the use of a spiral or table classifiers to produce a finer size heavy mineral concentrate. The low specific gravity material from the spiral or a table classifier is then passed through a hydrocyclone, with the underflow (coarse material) being rejected and the overflow (fine material that contains most of the uranium values) being fed (with other fine or slime materials) to a thickener for concentration prior to further processing. U.S. Pat. No. 2,562,024 relates to a process for recovering vanadium and uranium values from sandstone deposits using agitation to effect attrition of the soft gangue minerals. This is followed by a size separation process to reject coarse material to produce a concentrate having a size smaller than 75 μm or 45 μm, with the vanadium and uranium values reporting in the fines with other fine, gangue material. Thus, U.S. Pat. Nos. 2,968,524 and 2,562,024 both describe a process to reject coarse material and to produce a fine or slime fraction containing uranium values for further processing.

The prior art related to the beneficiation of uranium ores has either involved the use of methods such as flotation, magnetic separation, radiometric sorting or the rejection of coarse size fractions in order to produce a higher uranium grade feed stock for leaching. None of the prior art has described a process to produce a higher uranium grade feed stock for leaching which involves the rejection of the fine particulate (often termed "slimes") components of a uranium ore.

For all surficial uranium deposits that occur in semi-arid to arid environments, fine clay minerals and other fine particulate material are a significant issue with respect to the recovery circuit. The fine minerals limit operation of conventional process circuits and there are many examples around the world where fine particles impact on the processing plant performance and costs, resulting in reduced uranium recovery at higher cost.

DISCLOSURE OF INVENTION

The present inventor has developed a hydrocyclone beneficiation step for uranium ores that involves the rejection of the fine particulate component of the ore, thereby reducing the mass to be leached and improving the efficiency of the overall uranium recovery circuit.

In a first aspect there is provided a beneficiation process for uranium ore comprising a hydrocyclone beneficiation step that produces an underflow fraction and an overflow fraction according to a size separation parameter, wherein the uranium values are in particulate form and predominantly report to the underflow fraction for further processing, and the overflow fraction containing fine particulate waste material.

The present invention can be used for uranium ores that have fine particulate material present. Examples include surficial uranium deposits, sandstone deposits and quartz pebble conglomerate deposits, among others. The uranium mineral(s) can be present in various forms including, for example, liberated uranium-bearing mineral, composites of uranium mineral and carbonate mineral(s), uranium associated or composite with silicates or sulphates, uranium composite or associated with other gangue minerals, or any combination thereof.

The ore containing uranium-bearing mineral may comprise one or more of uranyl vanadate, uranyl phosphate, uranophane, or primary uranium minerals.

In an embodiment, the hydrocyclone operating conditions are selected so that the fine particulate material reporting to the hydrocyclone overflow is less than a selected size separation parameter. In an embodiment the size separation parameter is about 30 μm or less. In various embodiments, the size separation parameter may be about 5 μm, about 10 μm, about 15 μm, about 20 μm, about 25 μm or about 30 μm.

The fine material may comprise clay minerals or clay minerals together with some other fine gangue particles, such as fine-grained iron oxides (e.g., goethite) and the like.

The material that is fed into the hydrocyclone comprises a suspension of the uranium ore in water forming a slurry. The water may be from various sources, including, for example, seawater, bore water or potable water.

In an exemplary embodiment, the solids concentration (solids feed density) of the slurry that is passed through the hydrocyclone (or the first or 'primary' hydrocyclone in embodiments involving more than one hydrocyclone) has percent solids in the range of about 0.1 wt % to about 20 wt %. In other embodiments, the slurry has percent solids in the range of about 1 wt % to about 15 wt %, or about 1 wt % to about 10 wt %, or about 1 wt % to about 5 wt %, or about 2 wt % to about 5 wt %.

In an embodiment more than one hydrocyclone beneficiation step can be carried out to remove the fine particulate material.

In an embodiment two or more hydrocyclone beneficiation steps are carried out to remove the fine particulate material. The hydrocyclones may be operated counter-current or co-current.

In an embodiment the hydrocyclone feed material containing uranium is prepared by grinding and size separation of the uranium ore.

In another embodiment, the hydrocyclone feed material containing uranium is prepared by wet scrubbing and size separation of the uranium ore.

The overflow fraction containing the fine particulate material may be discarded as waste.

Following the hydrocyclone beneficiation step, the underflow fraction containing uranium values may be further processed by methods known to those skilled in the art including, for example, by fine grinding, magnetic separation, gravity separation or flotation, followed by leaching to extract the uranium, or any combination thereof.

In a second aspect there is provided an underflow fraction containing uranium values suitable for further processing produced by the process according to the first aspect of the present invention.

In a third aspect, there is provided use of a hydrocyclone beneficiation step to form an underflow fraction containing uranium values and an overflow fraction containing fine particulate waste material in a beneficiation process for uranium ore to remove fine particulate material from feed material containing uranium.

In order that the present invention may be more clearly understood, preferred embodiments will be described with reference to the following information and examples.

Definitions

Throughout this specification the term 'uranium mineral' includes secondary or primary uranium minerals or a mixture thereof comprising two or more uranium minerals. Secondary uranium minerals include uranyl vanadates (e.g., carnotite and tyuyamunite) and uranyl phosphates (e.g., torbernite, metatorbernite, autunite and meta-autunite) and uranophane. Primary uranium minerals include uraninite, coffinite, brannerite, davidite and pitchblende. The uranium ore may comprise one, two or more uranium minerals.

Throughout this specification the term 'about' is used to indicate that a specified value should not be construed as a precise or exact value, and that some variation either side of that value is contemplated and within the intended ambit of the disclosure. Thus, the term 'about' reflects tolerances within processes, techniques, equipment and variables known and used in the field where some variation is typical or inevitable and absolute precision according to a stated value is not practical or essential.

In the context of the present invention, the term 'predominantly' means 'substantially all' or 'the majority of, and includes 'all'.

Throughout this specification, unless the context requires otherwise, the word 'comprise', or variations such as 'comprises' or 'comprising', will be understood to imply the inclusion of a stated element, integer or step, or group of elements, integers or steps, but not the exclusion of any other element, integer or step, or group of elements, integers or steps. In other words, the term comprising is to be construed as 'including, but not limited to'.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this specification.

DETAILED DESCRIPTION

The present inventor has surprisingly found that hydrocyclones can be employed in a beneficiation process for uranium ores to reject fine particulate material to waste without resulting in high uranium losses. This arose from establishing a detailed understanding of how the distribution of minerals within a uranium ore varies as a function of particle size.

Relatively new mineral characterisation technologies (e.g. QEMSCAN which is an abbreviation for Quantitative Evaluation of Minerals by SCANning electron microscopy) coupled with expert sample preparation technologies provided the present inventor with new insights on the deportment of various minerals as a function of particle/agglomerate size within uranium ores. This showed that for many uranium ores, the fine particle size fraction (e.g., particles less than about 5 microns) has a uranium concentration much lower than the mass average. This also showed that the fine particle size fraction contained clay minerals, together with a number of other minerals such as calcite, dolomite, quartz, feldspar, gypsum, celestine, iron oxides, etc.

It has also been found that for some ores, while the grain size of the uranium minerals is extremely small (e.g., a micron or less), the uranium minerals may be present in the form of composite particles (i.e., the uranium minerals are physically bound with some gangue minerals, such as calcite and dolomite). This means that even though the grain size of the uranium minerals is extremely small, the uranium minerals will behave as a much larger, composite particle.

While it was known in the art that the uranium concentration of an ore varied with particle size, this information has only been used to concentrate the uranium by removing coarse size fractions, by methods such as screening and hydrocyclones, with the uranium reporting to the fine fraction.

The present inventor recognised that there is significant advantage in removing the fine particulate material from uranium ores in order to concentrate the uranium in the coarser fraction, as well as to achieve other processing benefits.

Accordingly, the present invention relates to a beneficiation process for uranium ore comprising a hydrocyclone step that produces an underflow fraction for further processing and an overflow fraction containing fine particulate waste material. The uranium values predominantly report to the underflow fraction.

During development of the present invention it was found that it was not feasible to use screens to split an aqueous suspension at a very fine size, for example at 5 µm, in order to separate fine particulate matter. However, it was found that it is possible to use a relatively standard hydrocyclone to separate the fine particulate material from the coarser material that contained most of the uranium minerals, thereby concentrating the uranium in the coarse fraction.

Rejection of fine gangue particulate material allows the coarser mineral particles in the hydrocyclone underflow to act without interference from the fine particles. This increases the efficiency of subsequent mineral separation techniques such as flotation, gravity, or magnetic separation. Rejection of fine particles in the hydrocyclone beneficiation step also reduces slurry rheology and reduces reagent consumption, which is particularly relevant for unit operations such as thickening and leaching. Rejection of the fine minerals is an enabler to further upgrading the uranium in the ore. In particular, removing fine minerals can greatly improve recovery and efficiency of subsequent unit operations.

The size separation parameter determines the particle size at which the uranium feed slurry is split or 'cut' within the hydrocyclone into an overflow stream (containing particles having a size less than the size separation parameter) and an underflow stream (containing particles having a size greater than the size separation parameter and most of the uranium values). Those skilled in the art will readily be able to select a suitable size separation parameter taking into account the nature of the uranium ore to be processed and the flowsheet as a whole. In particular, a suitable size separation parameter may be determined based upon the uranium deportment as a function of the particle size as determined by QEMSCAN analysis or by a similar technique. Alternatively, those skilled in the art will recognise that a suitable size separation parameter may also be determined based upon a series of measurements of the proportion of uranium in the overflow compared to that in the underflow produced by passing a suitable slurry of uranium ore through a hydrocyclone configured and operated to produce different cut sizes (i.e., different size separation parameters).

It may be advantageous to select a size separation parameter in the range between about 3 µm to about 106 µm. In various embodiments the size separation parameter for uranium ores would typically be about 30 µm or less, meaning that the hydrocyclone beneficiation step will separate fine particles having a particle size below 30 µm from the feed material. In various embodiments the size separation parameter may be about 5 µm, about 10 µm, about 15 µm, about 20 µm, about 25 µm or about 30 µm.

The present invention is based upon a physical separation of particles using one or more hydrocyclone(s) operated to split a slurry at a selected size separation parameter. It is recognised that the actual particle size of material that reports to the underflow or overflow of the hydrocyclone depends upon a number of factors, such as the particle density, the particle shape, the slurry concentration, the hydrocyclone parameters, etc. For example, those skilled in the art will understand that the particle size of material that reports to the overflow of a hydrocyclone will generally decrease as the density of a particle increases. Advantageously, since uranium minerals generally have a much higher density than the gangue minerals present in a given ore, the particle size of any uranium minerals that report to the overflow will generally be smaller than the particle size of the gangue particles.

Since it is a physical separation process, the invention can be applied to any uranium ore provided it can be dispersed in the form of an aqueous slurry and has a fine particle fraction that contains a low concentration of uranium. Hence, the invention could be used on uranium ores containing any uranium mineral or a combination of uranium minerals.

The uranium may be present as liberated particles or as composites with gangue minerals. In this case, even if the uranium grain size is very small, the uranium deportment in a hydrocyclone will depend upon the size (as well as density, shape, etc.) of the composite, not necessarily the uranium grain size.

Rejection of the fine material from a uranium ore allows the remaining coarser mineral particles to act without interference from the fine particles in subsequent mineral separation techniques.

The mass of material that reports to the overflow fraction will reflect the 'cut' size (i.e., the size separation parameter), particle density and the ore characteristics. In various embodiments, the mass of fine particulate material reporting to the overflow fraction (or combined overflow fractions if more than one hydrocyclone is used) will typically be within the range of about 1 wt % to about 80 wt % of the mass of a batch of ore processed in accordance with the invention.

One of the advantages of the present invention is that removal of fines in the hydrocyclone overflow fraction will reduce the mass of the underflow fraction containing uranium that ultimately reports to downstream processing steps. Thus, hydrocyclone beneficiation to reject fine particulate material according to the present invention may increase the efficiency of subsequent beneficiation steps (such as size separation, flotation, magnetic separation or gravity separation) and processing steps (such a leaching, counter-current decantation washing or gravity thickening), as well as reducing the mass of material that needs to be treated, the slurry viscosity and reagent consumption, each of which may provide a significant economic benefit.

In some embodiments a single hydrocyclone beneficiation stage is employed to reject the fine particulate material. In various embodiments the invention encompasses the use of two, three, four, five or more hydrocyclone beneficiation steps to remove unwanted fine particulate material.

In accordance with the present invention coarser particulate material including uranium values predominantly report to the underflow fraction. The expression 'predominantly report', and similar expressions, recognizes that there may be some uranium present in particles smaller than the selected size separation parameter and that, due to inefficiencies in the hydrocyclone performance, some particulate material coarser than a selected size separation parameter may report to the hydrocyclone overflow, and some material finer than the size separation parameter may report to the hydrocyclone underflow. Accordingly, the present invention also contemplates the use of multiple hydrocyclone steps to remove material that is coarser than the size separation parameter from the overflow of preceding hydrocyclones and to remove material that is finer than the size separation parameter from the underflow of preceding hydrocyclones.

When multiple hydrocyclone beneficiation steps are employed, each hydrocyclone step may be performed co-current or counter-current to a preceding hydrocyclone step.

Optionally, the hydrocyclone overflow fraction may be fed to a cleaning stage to recover some of the carried over uranium prior to disposal as a waste stream.

The hydrocyclone beneficiation step is carried out under conditions to maximise the movement of unwanted fine particulate material into the overflow fraction. Factors affecting the performance of a hydrocyclone include, but are not limited to, the physical hydrocyclone parameters such as diameter, vortex finder and spigot aperture, and the operating conditions of pressure, volume split to underflow and feed percent solids. It will be appreciated that these conditions can be selected or varied depending on the nature of the uranium ore to maximise the movement of unwanted fine particulate material to the overflow fraction while retaining uranium values in the underflow fraction for further processing. A person skilled in the art would know that varying these conditions will result in similar particle size separation by the hydrocyclone. e.g., increasing both the vortex finder and spigot diameters in proportion will likely produce a similar separation size.

The density of the feed material that is initially fed into the hydrocyclone can also influence separation efficiency. Typically, the higher the viscosity of the feed material, the less efficient the separation process, which can lead to increased cost. Those skilled in the art will readily be able to manipulate the density of the feed material according to the properties and quantity of the particular ore to be processed.

In an embodiment, the solids feed density, i.e., the solids concentration of the slurry that is passed through the hydrocyclone (or the first or 'primary' hydrocyclone in embodiments involving the use of multiple hydrocyclone steps), is in the range of about 0.1 wt % to about 20 wt %. In other embodiments. the slurry has percent solids in the range of about 1 wt % to about 15 wt %, or about 1 wt % to about 10 wt %, or about 1 wt % to about 5 wt %, or about 2 wt % to about 5 wt %.

In further embodiments the hydrocyclone is operated at about 20 wt % solids feed density, 19 wt % solids feed density, 18 wt % solids feed density, 17 wt % solids feed density, 16 wt % solids feed density, 15 wt % solids feed density, 14 wt % solids feed density, 13 wt % solids feed density, 12 wt % solids feed density, 11 wt° solids feed density, 10 wt % solids feed density, 9 wt % solids feed density, 8 wt % solids feed density, 7 wt % solids feed density, 6 wt % solids feed density, 5 wt % solids feed density, about 4 wt % solids feed density, about 3 wt % solids feed density, about 2 wt % solids feed density, or about 1 wt % solids feed density, or about 0.5 wt % solids feed density, or about 0.1 wt % solids feed density.

In embodiments involving the use of two or more hydrocyclone steps, those skilled in the art will understand that the solids concentration of slurry fed to subsequent hydrocyclones may be similar to or different from the density of the solids concentration of the slurry fed to the primary hydrocyclone step.

Uranium Ore

The present invention can be used in beneficiation processes for various uranium ores The present invention can be used for uranium ores which have fine particulate material present, including but not limited to the following ore types defined by the International Atomic Energy Agency (IAEA):
 a. Surficial uranium deposits,
 b. Sandstone deposits,
 c. Quartz pebble conglomerate deposits.

The uranium mineral(s) can be present in various forms, in any combination of the following:
 a. liberated uranium-bearing mineral,
 b. composites of uranium mineral and carbonate mineral(s),
 c. uranium associated with silicates or sulphates,
 d. uranium composite or associated with other gangue minerals.

The uranium-bearing mineral may comprise one or more of the following minerals/mineral categories in any proportion:
 a. uranyl vanadate,
 b. uranyl phosphate,
 c. uranophane,
 d. primary uranium minerals.

Feed Material

Uranium ore that has been processed to produce a slurry, for example, by grinding and size separation, or wet scrubbing and size separation, is suitable feed material for the hydrocyclone beneficiation step.

The nature of the uranium mineral itself has no effect on the separation and rejection of fine particles during the hydrocyclone beneficiation step.

The feed material typically comprises a suspension of the uranium ore in water forming a slurry. One or more additives or dispersants may be added to the water to alter the degree of dispersion of the particles within the slurry.

Suitable dispersants include chemicals for dispersion of particles in a slurry that are known to those skilled in the art and include but are not limited to low molecular weight polymers such as polyacrylates and polystyrene sulfonate, organic reagents such as carboxymethyl cellulose and dextrin, and inorganic reagents such as sodium pyrophosphate and sodium tripolyphosphate, among others. The composition and the dosage rate of the dispersant will depend on the solids matrix in the slurry and those skilled in the art can routinely determine an appropriate dispersant and dosage rate.

The dispersion of the particles in the slurry may also be altered before processing by changing the pH of the slurry. This may be done with or without the addition of dispersants. Examples of suitable chemicals to alter the slurry pH are well known to those skilled in the art and include, for example, acids such as sulphuric, hydrochloric or nitric acids to make the slurry more acidic, or alkali substances such as calcium oxide, hydroxide or carbonate to make the slurry more basic.

Hydrocyclone

The hydrocyclone beneficiation step can be carried out using commercial hydrocyclones generally available to the mineral processing industry. Examples of suitable hydrocyclones include Salter Cyclones Ltd (United Kingdom), small diameter Mozley hydrocyclones and also hydrocyclones from FLSmidth, KREBS, Warman. Linatex, and Weir Minerals who are well known manufacturers and suppliers.

The hydrocyclone is a metallurgical tool that separates particles in aqueous suspension by the use of centrifugal and gravitational forces. The behaviour of a particle in a hydrocyclone depends mainly upon its size, but other parameters, such as density and shape, also have an influence. It is primarily a volumetric separation apparatus with the greater volume including fines reporting to the overflow and the lesser volume including coarser solids reporting to the underflow.

The feed slurry enters the feed chamber tangentially. The inlet velocity initiates a rotational pattern that creates a downward spiral in the feed chamber. The diameter of the hydrocyclone decreases in the cone section below the feed chamber. Centrifugal forces push the coarser material outward toward the cone wall. This increases the percent solids near the walls by displacing the water toward the centre of the cone.

To counteract the crowding action as the cone diameter decreases, a secondary interior spiral or vortex is formed from the remaining liquid and fine solids. This vortex causes the liquid and fine solids to be carried up and out as the hydrocyclone overflow. The descending coarser solids will exit the hydrocyclone through the apex at relatively high solids concentration (hydrocyclone underflow).

Factors affecting the performance of a hydrocyclone include, but are not limited to: hydrocyclone size, feed inlet pressure, feed percent solids, sizing of the vortex finder and apex.

Operating Conditions

The hydrocyclone beneficiation step is carried out under conditions to move unwanted fine particulate material into the overflow fraction without unreasonable loss of uranium bearing material. It will be appreciated that the hydrocyclone conditions such as solids feed density, volume splits to hydrocyclone underflow, hydrocyclone diameter and inlet and outlet diameters, and pressure can be selected or varied depending on the makeup of the low grade uranium ore and the feed material to move unwanted fine particulate material to the overflow fraction while retaining uranium values in the underflow fraction for further processing.

When two or more hydrocyclone steps are used the hydrocyclones may be operated counter-current or co-current, or a combination thereof in any order.

EXAMPLES

The most common and well utilised method for producing size fractions of an ore below about 38 μm is to use a Warman cyclosizer. This is a laboratory scale device with five small diameter glass hydrocyclones. A slurry is passed in sequence through these five hydrocyclones, each designed to split at a different particle size. The underflow from each hydrocyclone is collected, with the overflow passing to the next cyclone. A Warman cyclosizer produces particle size fractions as shown in Table 1 below (note—the actual cut sizes can be dependent on the density of the particles, the temperature of the slurry and other factors).

TABLE 1

| Typical size fractions from | | |
|---|---|---|
| Hydrocyclone stream | Termed | Size fraction |
| First hydrocyclone underflow | C1 | >38 μm |
| Second hydrocyclone underflow | C2 | 29 to 38 μm |
| Third hydrocyclone underflow | C3 | 21 to 29 μm |
| Fourth hydrocyclone underflow | C4 | 14 to 21 μm |
| Fifth hydrocyclone underflow | C5 | 10 to 21 μm |
| Fifth hydrocyclone underflow | -C5 | <10 μm |

Example 1

Two calcrete uranium ores, both containing carnotite as the only uranium mineral, (Ore 1 was from Namibia and Ore 2 was from Australia) were crushed to less than 2 mm then prepared as a 50 wt % slurry in Perth tap water. After screening each at 38 μm, the undersized material was passed at a solids density of about 0.1 wt % through a Warman cyclosizer to produce the size fractions shown in Table 1.

The results from chemical analysis of the −05 size fraction is shown in Table 2 for both Ore 1 and Ore 2.

TABLE 2

Mass distribution and uranium distribution for the -C5 fraction produced by passing Ore 1 and Ore 2 through a Warman cyclosizer. Note that the percentages are expressed as a function of the total sample (i.e., material less than 2 mm).

| Source | Mass (<10 gm) (%) | Uranium Dist (wt %) |
|---|---|---|
| Ore 1 -C5 fraction (<10 μm) | 16 | 20 |
| Ore 2 -C5 fraction (<10 μm) | 20 | 23 |

Analysis of this data could suggest that the uranium losses from a hydrocyclone separation at about 10 μm would be about 20 wt % for Ore 1 and about 23 wt % for Ore 2. This would generally be considered much too high and therefore fine particle separation by a hydrocyclone would be dismissed as a viable process unit operation because of the associated uranium losses.

Both Ore 1 and Ore 2 were analysed using QEMSCAN to determine the carnotite grain size. The results are shown in Table 3.

TABLE 3

Mass distribution of carnotite in Ore 1 and Ore 2 as a function of grain size as determined by QEMSCAN.

| Source | Carnotite Grain Size | Weight Percent |
|---|---|---|
| Ore 1 | <30 μm | 78 |
|  | <10 μm | 11 |
|  | <6 μm | 3 |
| Ore 2 | <30 μm | 94 |
|  | <10 μm | 19 |
|  | <6 μm | 4 |

The QEMSCAN analysis showed that very little of the carnotite present in both Ore 1 and Ore 2 had a grain size below about 6 μm, providing the insight that rejection of material less than 6 μm would not result in significant loss of uranium.

The −125 μm fraction from Ore 1 and Ore 2 was passed through a hydrocyclone set up to achieve size separation at about 4 μm for Ore 1 and about 6 μm for Ore 2, based upon a particle density of 2.5 g cm$^3$. The conditions for each hydrocyclone test are shown in Table 4.

TABLE 4

Test conditions used to process the −125 μm fraction from Ore 1 and Ore 2.

| Conditions | Ore 1 | Ore 2 |
|---|---|---|
| Feed density (wt %) | 5 | 3 |
| Mozley hydrocyclone diameter (mm) | 25 | 25 |
| Pressure (psi) | 73 | 51 |
| Vortex finder diameter (mm) | 3.0 | 5.5 |
| Spigot diameter (mm) | 3.2 | 3.2 |
| Size separation parameter (μm) | ~4 | ~6 |
| Hydrocyclone pass | single | single |

The results shown in Table 5 were obtained.

TABLE 5

Weight distribution and uranium distribution in the hydrocyclone overflow for Ore 1 and Ore 2. Note that percentages are expressed as a function of the hydrocyclone feed.

| Source | Size fraction | Mass (%) | Uranium Dist (wt %) |
|---|---|---|---|
| Ore 1 | <~4 μm | 10 | 6 |
| Ore 2 | <~6 μm | 31 | 8 |

For both Ore 1 and Ore 2 it was found that a significant amount of the mass could be rejected in the hydrocyclone overflow, without significant uranium losses. For Ore 1, the hydrocyclone overflow fraction (i.e., material less than about 4 μm) comprised 10 wt % of the mass, but only 6 wt % of the uranium. For Ore 2, the hydrocyclone overflow (i.e., material less than about 6 μm) comprised 31 wt % of the mass, but only 8 wt % of the uranium. This indicated that it was feasible to split a uranium ore at a very fine size using a hydrocyclone and recover a very high proportion of the uranium values in the underflow fraction.

Example 2

Ore 1 was wet scrubbed and screened at 125 μm with the −125 μm slurry used as the feed to the hydrocyclone tests. Tests were completed in Perth tap water with the following conditions:
25 mm diameter Mozley hydrocyclone
500 kPa (73 psi) operating pressure
3.0 mm diameter vortex finder
3.2 mm diameter spigot
~4 μm size separation parameter
Single pass
~125 μm feed size The results from passing Ore 1 through the hydrocyclone set up to split the slurry at about 4 μm are shown in Table 6.

TABLE 6

Weight distribution, uranium grade and uranium distribution in the overflow produced after passing a slurry of Ore 1 at two densities through a hydrocyclone set up to split at about 4 μm.

| Feed | Hydrocyclone Overflow* | | |
|---|---|---|---|
| Density (wt %) | Wt (%) | U Grade (ppm) | U Dist (%) |
| 5 | 15 | 97 | 8 |
| 2.5 | 11 | 56 | 3 |

*Percentages are expressed as a function of the hydrocyclone feed.

The results demonstrate that the density of the slurry feed has an effect on the efficiency of the hydrocyclone's performance.

Example 3

The −125 μm slurry of the Ore 1 sample was tested according to the procedures detailed in Example 2, but for a reduction in the operating pressure to 276 kPa (40 psi).

The results given in Table 7 below, when compared to the results in Table 6, show that the lower pressure reduces the mass of material reporting in the hydrocyclone overflow.

TABLE 7

Weight distribution, uranium grade and uranium distribution in the overflow produced after passing a slurry of Ore 1 through a hydrocyclone.

| Feed | Hydrocyclone Overflow* | | |
|---|---|---|---|
| Density (wt %) | Wt (%) | U Grade (ppm) | U Dist (%) |
| 5 | 8 | 116 | 4 |

*Percentages are expressed as a function of the hydrocyclone feed.

Example 4

The procedure used in Example 2 to generate the −125 μm slurry samples was used in Example 4, but Indian Ocean sea water from the Perth region was used rather than Perth tap water. The hydrocyclone conditions used were as given in Example 3, but four co-current stages were used in this example.

The results given in Table 8 below show that the hydrocyclone separation is effective in high salt content water (sea water) as well as fresh water (tap water).

TABLE 8

Influence of water quality on the overall weight distribution, uranium grade and uranium distribution in the overflow produced after passing a slurry of Ore 1 through four hydrocyclones operated co-currently and set up to split at about 4 μm.

| | Hydrocyclone Overflow* | | |
|---|---|---|---|
| Water Type | Wt (%) | U Grade (ppm) | U Dist (%) |
| Perth tap water | 21 | 120 | 10 |
| Sea water | 27 | 125 | 14 |

*Percentages are expressed as a function of the hydrocyclone feed.

Example 5

Ore 2 was ground to 400 μm and screened at 125 μm with the −125 μm fraction used as the feed for the hydrocyclone tests. Two hydrocyclones were used configured such that the overflow from hydrocyclone 1 (referred to as the Rougher hydrocyclone) was the feed to hydrocyclone 2 (referred to as the Cleaner hydrocyclone).

Tests were completed in Perth tap water with the following conditions:
25 mm diameter Mozley hydrocyclone
350 kPa (51 psi) operating pressure
5.5 mm diameter vortex finder
3.2 mm diameter spigot
~6 μm size separation parameter
3 wt % feed density to Rougher test
Single pass each stage The results given in Table 9 below show that a high percentage of the mass feeding the hydrocyclone can be rejected that contains only a small percentage of the uranium.

TABLE 9

Weight distribution, uranium grade and uranium distribution in the Rougher and Cleaner overflows produced after passing a slurry of Ore 2 through two hydrocyclones set up to split at about 6 μm.

| Test | Feed Density (wt %) | Hydrocyclone Overflow | | |
|---|---|---|---|---|
| | | Wt (%) | U Grade (ppm) | U Dist (%) |
| Rougher* | 3 | 28 | 150 | 6 |
| Rougher + Cleaner[1] | | 24 | 125 | 4 |

*Percentages are expressed as a function of the hydrocyclone feed.
[1]Percentages are expressed as a function of the hydrocyclone rougher feed It will be appreciated by persons skilled in the art that numerous variations and/or modifications may be made to the invention as shown in the specific embodiments without departing from the spirit or scope of the technology as broadly described. The present embodiments are, therefore, to be considered in all respects as illustrative and not restrictive.

The invention claimed is:

1. A beneficiation process for concentrating uranium ore, the process comprising:
performing one or more hydrocyclone beneficiation step(s) on a feedstock comprising uranium-containing particles to produce a coarse underflow fraction and a fine overflow fraction according to a particle cut size,
wherein after the beneficiation step(s) at least 80% by mass of the uranium-containing particles of the feedstock reports to the underflow fraction to thereby form a uranium concentrate for further processing, and
wherein fine particulate waste material reports to the overflow fraction.

2. The process according to claim 1, wherein the particle cut size of the hydrocyclone is about 30 μm or less.

3. The process according to claim 2, wherein the particle cut size of the hydrocyclone is about 5 μm, 10 μm, 15 μm, 20 μm, 25 μm or 30 μm.

4. The process according to claim 2, wherein the particle cut size of the hydrocyclone is about 10 μm.

5. The process according to claim 2, wherein the particle cut size of the hydrocyclone is about 6 μm.

6. The process according to claim 2, wherein the particle cut size of the hydrocyclone is about 5 μm.

7. The process according to claim 2, wherein the particle cut size of the hydrocyclone is about 4 μm.

8. The process according to claim 1, comprising two or more hydrocyclone beneficiation steps.

9. The process according to claim 8, wherein hydrocyclones in the two or more hydrocyclone beneficiation steps are operated co-current, counter-current, or a combination thereof in any order.

10. The process according to claim 1, wherein the hydrocyclone beneficiation step is performed after a feed preparation step.

11. The process according to claim 10, wherein the feed preparation step comprises one or more of grinding, scrubbing and screening.

12. The process according to claim 1, wherein the feedstock for the hydrocyclone beneficiation step comprises an aqueous suspension of the uranium ore in the form of a slurry.

13. The process according to claim 12, wherein a solids concentration of the slurry that is passed through the hydrocyclone has percent solids in the range of about 0.1 wt % to about 20 wt %.

14. The process according to claim 12, wherein the slurry contains one or more chemical additives to alter the degree of dispersion of the particles within the slurry.

15. The process according to claim 1, wherein the further processing comprises one or more steps selected, in any order, from grinding, spirals, elutriation, magnetic separation, gravity separation and flotation to further concentrate the uranium.

16. The process according to claim 1, wherein the further processing comprises a grinding step.

17. The process according to claim 1, wherein the further processing comprises a flotation step.

18. The process according to claim 1, wherein the further processing comprises a leaching step to extract the uranium.

19. The process according to claim 8, wherein at least 80% by mass of uranium reports to a combination of underflow fractions from each hydrocyclone step.

20. The process according to claim 1, wherein one or more hydrocyclone beneficiation step(s) comprises two or more hydrocyclones, operated co-current, counter-current, or a combination thereof in any order.

* * * * *